United States Patent [19]
Greff

[11] Patent Number: 5,245,729
[45] Date of Patent: Sep. 21, 1993

[54] FLEXIBLE LINE FASTENER DEVICE

[76] Inventor: Dennis W. Greff, R.R. 3, Box 7, Mott, N. Dak. 58646

[21] Appl. No.: 989,757

[22] Filed: Dec. 14, 1992

[51] Int. Cl.⁵ .............................................. F16G 11/00
[52] U.S. Cl. ..................................... 24/129 R; 24/130
[58] Field of Search .................. 24/129 R, 129 A, 130, 24/115 M, 136 R

[56] References Cited

U.S. PATENT DOCUMENTS

| | | | |
|---|---|---|---|
| 556,485 | 3/1896 | Wilson | 24/129 R |
| 749,235 | 1/1904 | Smith | 24/129 R |
| 986,014 | 3/1911 | Krenzke | 24/130 |
| 1,670,257 | 5/1928 | Hagen | 24/130 |
| 3,465,391 | 9/1969 | Armstrong | 24/129 R |
| 4,373,463 | 2/1983 | Beaudette | 24/129 R |
| 4,896,403 | 1/1990 | Vouros | 24/130 |
| 4,939,820 | 7/1990 | Babcock | 24/129 R |
| 5,018,774 | 5/1991 | Rasmussen | 24/129 R |

FOREIGN PATENT DOCUMENTS

| | | | |
|---|---|---|---|
| 0101868 | 9/1937 | Australia | 24/129 R |
| 0428520 | 7/1967 | Switzerland | 24/130 |

Primary Examiner—Victor N. Sakran
Attorney, Agent, or Firm—David A. Lingbeck

[57] ABSTRACT

This invention relates to a flexible line fastener device for securely holding flexible lines to stationary objects such as poles and the like, in particular. This device comprises an elongated plate-like base contoured to fit securely about a pole as such; a grommet disposed on a front surface of the base near a top end thereof for anchoring flexible lines removably fastened to the device; a plurality of elongated cleats longitudinally integral to the base and arranged at acute angles to the axes of the base and each having a V-shaped end to effectively grip a flexible line wound through and about the cleats; and a clasp member disposed near the top end of the base to effectively secure the flexible line in the cleats.

5 Claims, 5 Drawing Sheets

FLEXIBLE LINE FASTENER DEVICE

BACKGROUND OF THE INVENTION

The present invention relates, in general, to a flexible line fastener device for securely fastening ropes, strings, straps, and cords as such.

Many types of prior art of various designs have been developed to secure or restrain ropes, strings, straps, and cords for various applications, but no device has been developed which will quickly and effectively secure straps, ropes, strings, and cables as such especially in applications involving, in particular, the securing of volleyball and tennis cords as such to poles in particular. The review of the prior art does not suggest the device as described in the present invention.

One known prior art is a design patent for a CLEAT, U.S. Pat. No. 287,097. Another known prior art is a STRAP CONNECTOR, U.S. Pat. No. 5,018,774, which comprises a body having upper and lower ends, front and back surfaces, and side edges, a loop at the upper end disposed on the front surface of the body, and a plurality of anchor projections on the front surface, arranged to engage straps laced through the projections. The STRAP CONNECTOR couples at least two straps together, but is not mountable to a structure such as poles and the like for securely fastening ropes, strings, or straps quickly and effectively.

Another known prior art is a ROPE FASTENER, U.S. Pat. No. 4,939,820, which comprises a rigid planar body having an outer periphery, an aperture through the body at a top end thereof, a loop disposed on a back surface of the body near a bottom end thereof, and staggered V-shaped recesses in edges of the body along the periphery thereof. The ROPE FASTENER couples together at least two ropes, but, like the strap connector, the ROPE FASTENER is not mountable to a structure such as poles for securely fastening ropes, strings, or straps as such to the poles.

Another known prior art is a CABLE STAY, U.S. Pat. No. 3,309,745, which comprises an elongated body having a first side and a second side, a plurality of slots through and along the body for receiving a cable, and a loop extending from an end of and generally in alignment with the body for attaching to a building structure. The CABLE STAY supports the cable strung through the slots, but is not mountable directly to the building structure because the cable is strung through the slots and about the body. The CABLE STAY is not usable to securely fasten ropes, cables, strings, straps, or the like to a structure such as poles and is not structured to securely fasten tennis and volleyball cord, in particular.

Another known prior art is THE GRIPPER, U.S. Pat. No. 4,373,463, which comprises a body, a plurality of longitudinally spaced cleats laterally extending along the surface of the body. Adjacent cleats have V-shaped opposite ends which have planar upper faces and planar lower faces. A rib longitudinally extends outward from the faces of the V-shaped ends for gripping a flexible line. The CLEAT DEVICE has a pair of holes extending through the base one near each end of the base for fixedly mounting the device to a larger structure. The CLEAT DEVICE permits rapid restraining of flexible lines such as ropes for mooring boats to docks or the like. The CLEAT DEVICE is not structured to fasten rope or the like where the rope, as strung, extends outwardly away from the front surface of the base. The upper faces of the V-shaped open ends of the cleats break off as a result of the stress, tension, and leverage exerted on the cleats by the rope or the like as the rope is tighten about the cleats. The present invention is structured to virtually eliminate this problem for applications where the flexible line extends outwardly away from the front surface of the base as is the case where the cords of volleyball and tennis nets are tightly strung to opposed poles.

There is a definite need for a new flexible line fastener device which overcomes the problems noted above.

SUMMARY OF THE INVENTION

The present invention relates to a flexible line fastener device for securely fastening ropes, strings, straps, line cords, and the like to stationary objects such as poles and the like. The flexible line fastener device comprises a generally elongated base having a generally convex surface for essentially and effectively mounting to cylindrical poles for fastening ropes, strings, and the like including cords of volleyball and tennis nets. The flexible line fastener device also comprises three spaced cleats with the top and bottom cleats positioned parallel to each other and with the middle cleat angled relative to the other two cleats. The three cleats extend perpendicular from the surface of the base and are angularly positioned along the surface of the base relative to the bottom edge of the base with the cleats having V-shaped bottom ends which have lower surfaces and upper surfaces and which have ribs longitudinally extending upon the lower surfaces and upper surfaces for gripping flexible lines. Also, a clasp or clip member is disposed in the convex surface of the base to hold the flexible lines taut in the cleats, in particular, and a grommet is disposed in the convex surface near the top end thereof for effectively anchoring the rope, cord, or the like as the cord is strung about the cleats to securely fasten the flexible line without knotting the flexible line. The flexible line fastener device has a pair of holes extending through the base one near each end of the base for removably mounting the device to a pole or the like. The fastener device essentially mates to a cylindrical pole as such.

It is an object of this invention to provide a flexible line fastener device which securely fastens flexible lines quickly and effectively to larger structures such as poles, in particular.

Another object of this invention is to provide a flexible line fastener device which has the strength to effectively securely fasten cords of tennis and volleyball nets, in particular, without breaking away caused from the stress and force of tightly stretching the nets.

Yet another object of this invention is to provide a flexible line fastener device which is structured to effectively mount about poles, in particular, with no portion of the base projecting from the poles, thus minimizing possible injury to the users coming into contact with the device as they either play or work around where the device is mounted.

Another object of this invention is to provide a flexible line fastener device which eliminates the user from having to tie a knot to securely fasten the flexible lines to poles in particular.

Further objects and advantages of the present invention will become apparent as the description proceeds and when taken in conjunction with the accompanying drawing wherein:

DETAILED DESCRIPTION OF THE INVENTION

Figure 1:
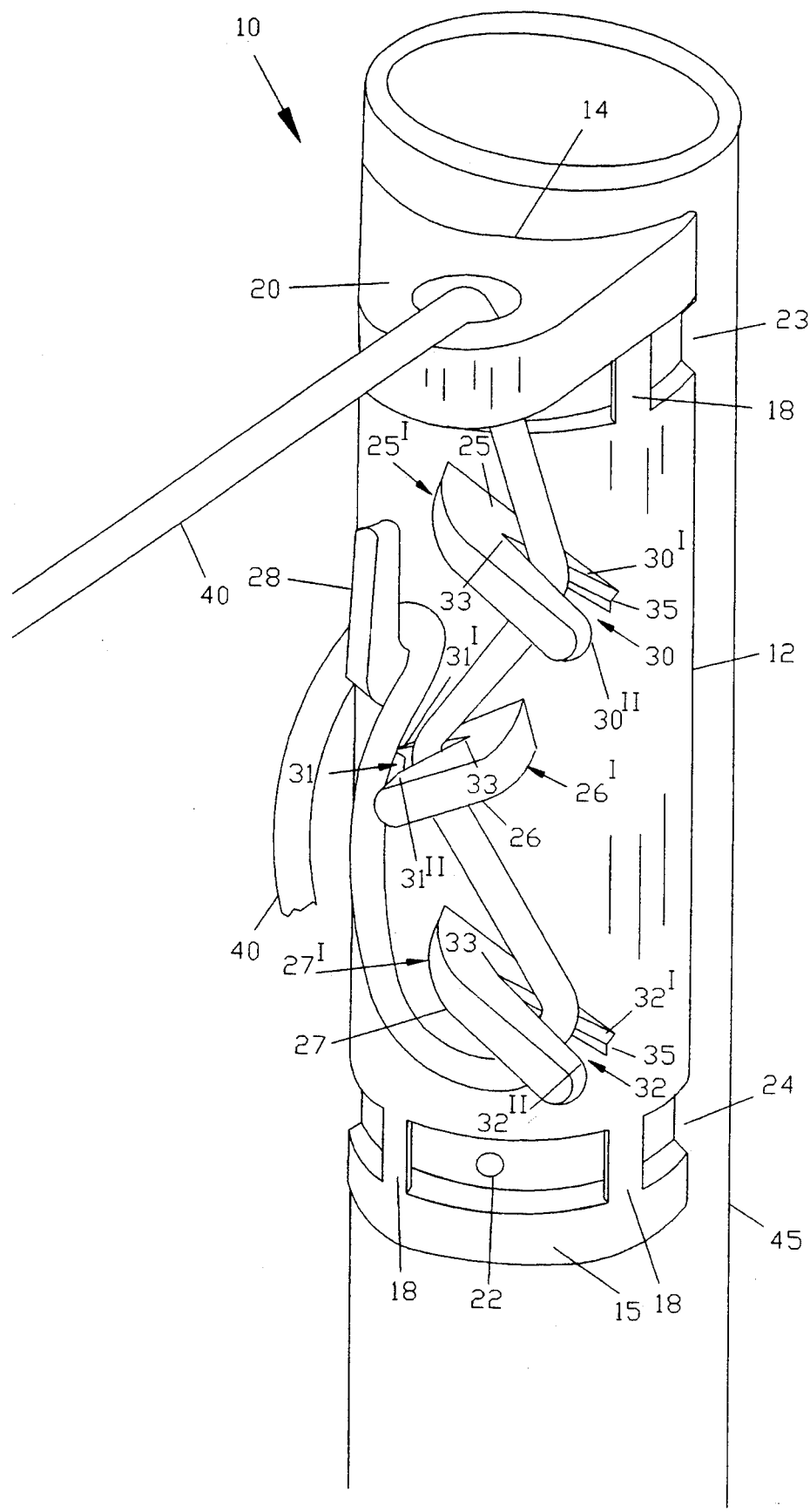
FIG. 1 is a perspective view showing the flexible line fastener device mounted to a pole and securely fastening a flexible line or cord as such.
Figure 2:
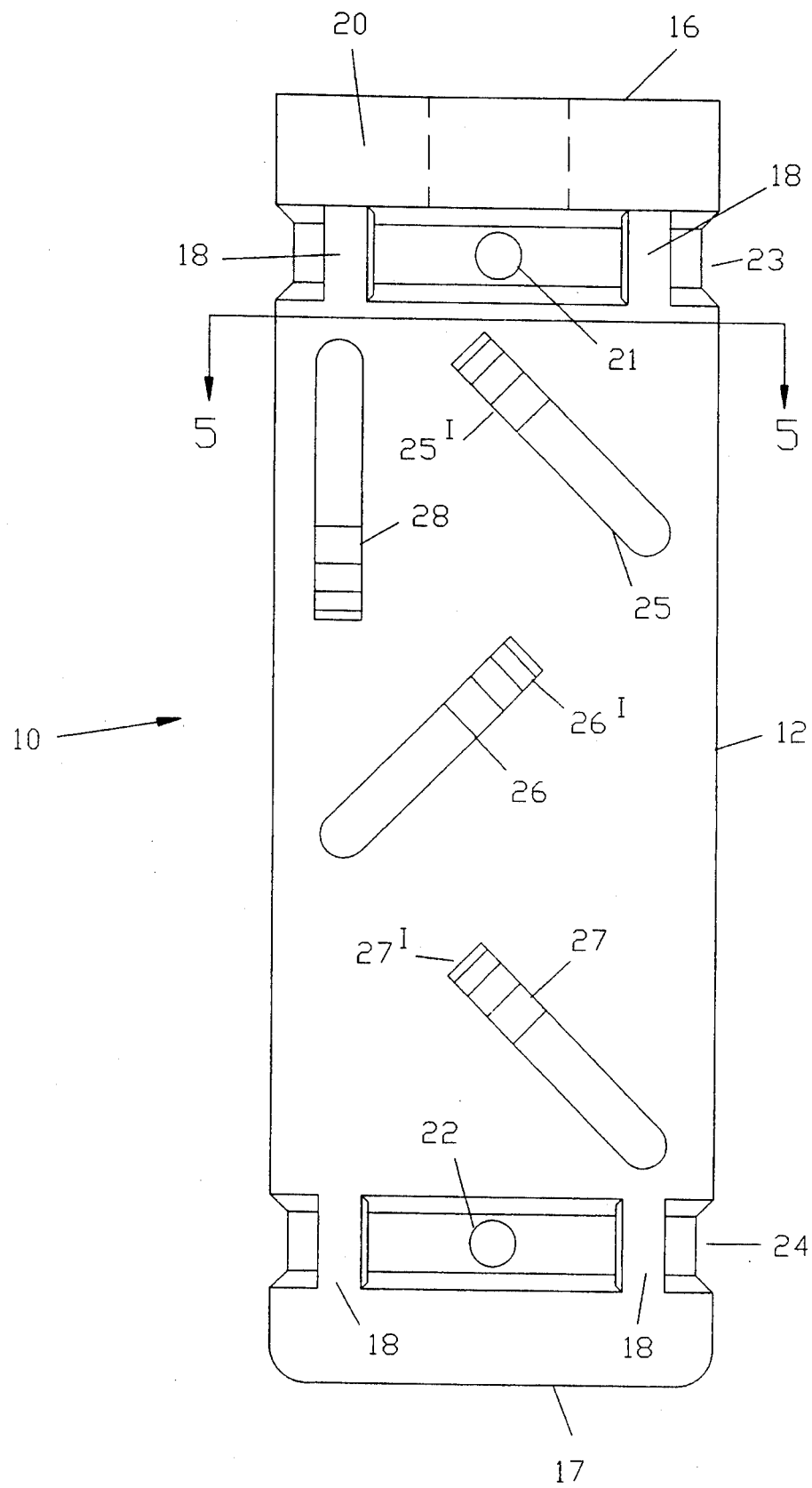
FIG. 2 is a front elevational view of the flexible line fastener device.
Figure 3:
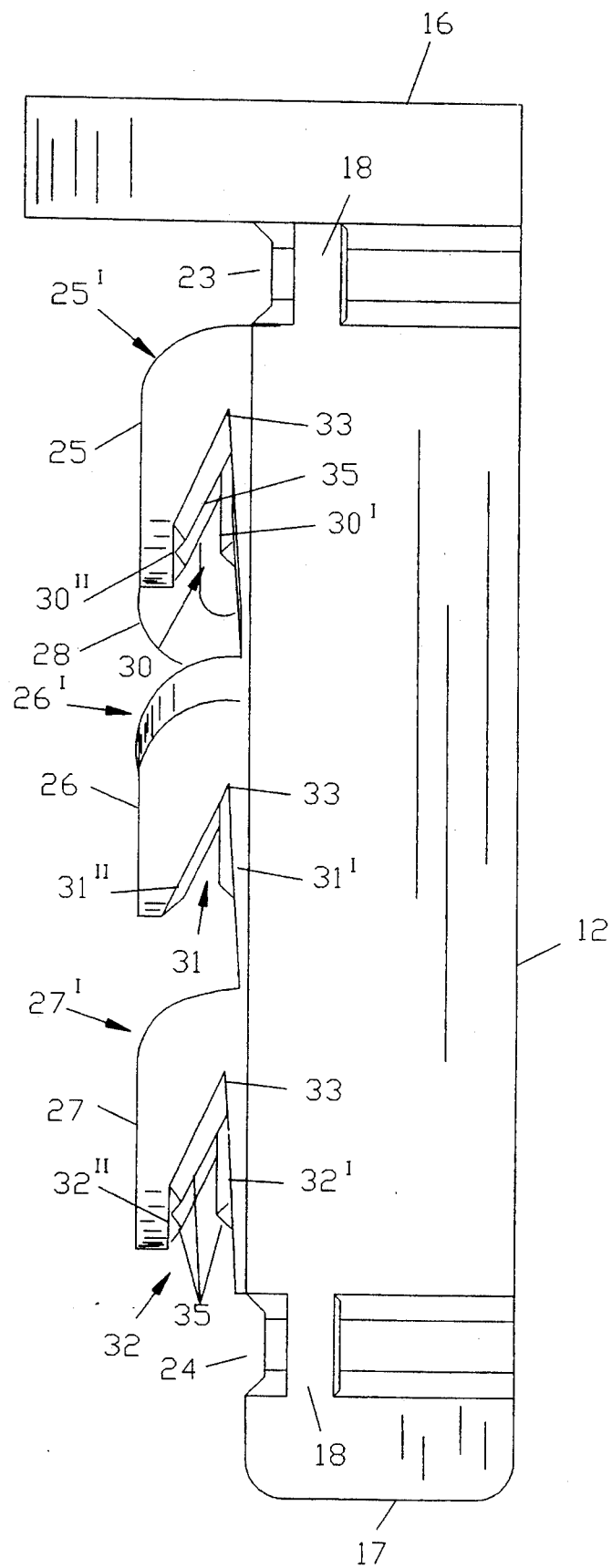
FIG. 3 is a side elevational view of the flexible line fastener device showing the projections of the grommet and the cleats.

Referring more particularly to the drawings in FIGS. 1, 2, 3, 4, and 5, the flexible line fastener device 10 is illustrated as having an elongated plate-like base 12 having a lateral generally convex front surface 14 and a lateral concave rear surface 15; a grommet 20 integrally disposed into and extending outward from the front surface 14 near a top end 16 of the base 12; and three elongated cleats 25, 26, and 27 extending outwardly from the front surface 14 of the base 12 and angularly disposed longitudinally along the front surface 14 of the base 12. As shown in FIG. 3, the cleats 25, 26, and 27 are angled relative to the axes of the base 12 and have curved top ends 25', 26', and 27' and axial V-shaped bottom ends 30, 31, and 31. Further, the top 25 and bottom 27 cleats are generally parallel to one another with the middle cleat 26 angled at a preferred angle of between 45 and 90 degrees relative to the top and bottom cleats 25 and 27. As shown in FIG. 6, the axial V-shaped ends 30, 31, and 32 have lower surfaces 30', 31', and 32' and upper surfaces 30", 31", and 32" which converge at acute angles of preferably between 15 and 60 degrees. As illustrated in FIG. 6, the converging joints 33 of the lower and upper surfaces have gripping surfaces angled relative to the longitudinal axes of the cleats 25, 26, and 27 and are generally parallel to the longitudinal axis of the base 12 to provide effective gripping tension on all sides of the flexible line 40. As shown in FIG. 1, two parallel ribs 35 extend longitudinally along each of the lower surfaces of the V-shaped ends 30, 31, and 32 of the cleats 25, 26, and 27, and one rib 35 extends longitudinally along each of the upper surfaces 30", 31", and 32" of the V-shaped ends of the cleats. The ribs 35 on each of the lower surfaces 30', 31', and 32' are staggered relative to the rib 35 on each of the upper surfaces 30", 31", and 32" for effective gripping and holding the flexible line 40.

As shown in FIGS. 1 and 3, the flexible line fastener device 10 further comprises a L-shaped clasp or clip member 28 affixed to and extending outward from the base 12 near the top end 16 thereof to hold taut the flexible line 40 in the cleats 25, 26, and 27. Also, the flexible line fastener device 10 has a pair of holes 38 and 39 through the base 12 one near the bottom end 17 thereof and the other near the top end 16 thereof to removably mount the device 10 to a stationary object 45 contoured to receive the device 10, the object being a pole or the like. Also, the base 10 has a pair of grooves 23 and 24 laterally extending in and along the front surface 14 thereof one near each end thereof and has four strap elongate guide members 18 affixed to the front surface 14 and spanning the grooves 23 and 24 defining openings between the grooves 23 and 24 and the guide members 18. The guide members 18 traversing over each groove are spaced apart for effective guiding and supporting straps (not shown) used to removably mount the device 10 to a pole 45 or the like.

Figure 4:
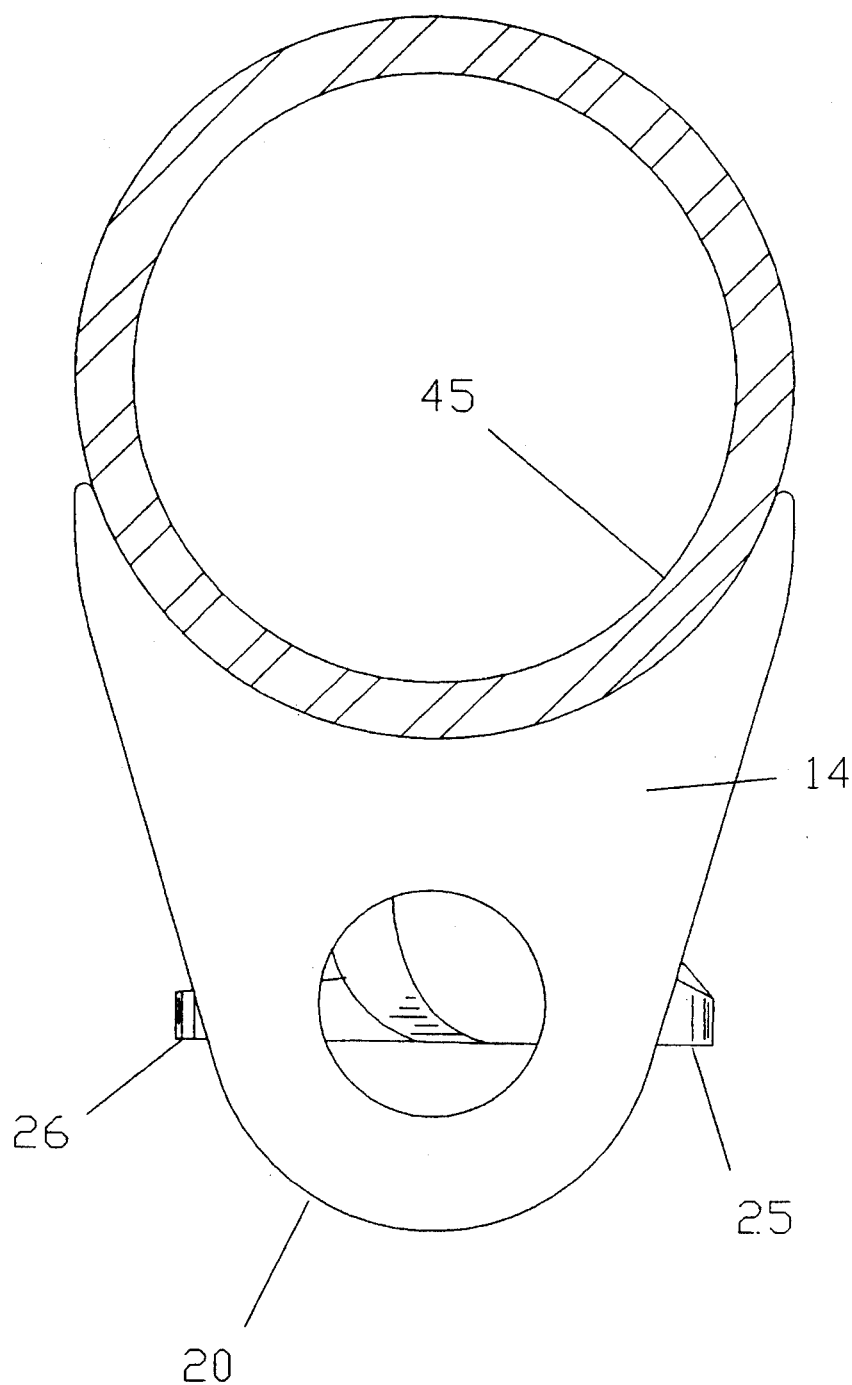
FIG. 4 is a top view of the flexible line fastener device showing the convex base mounted to a pole and the grommet extending outwardly from the base
Figure 5:
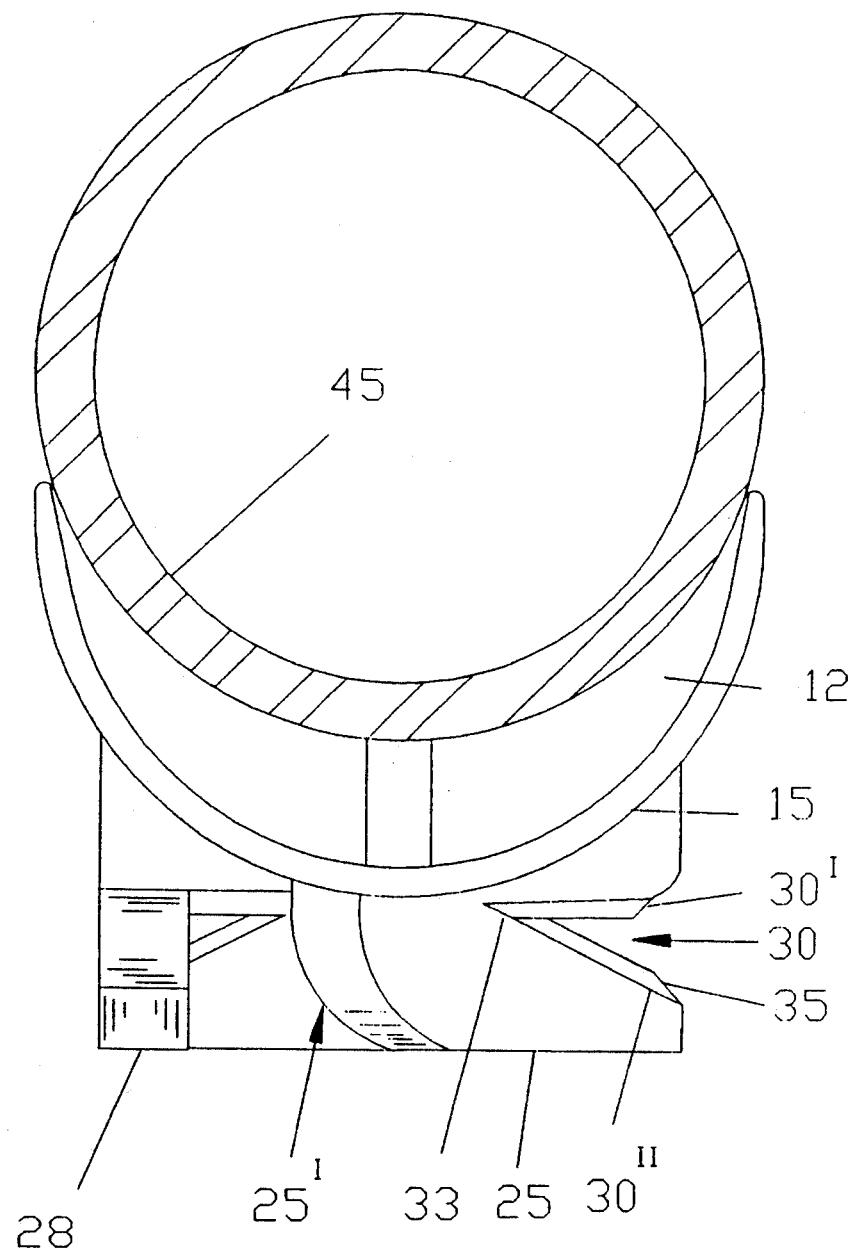
FIG. 5 is a section view of the flexible line fastener device taken along line 5—5 of FIG. 2 showing the convex base mounted to a pole and the uppermost cleat and the cleat member projecting outwardly from the base.

As shown in FIGS. 4 and 5, the fastener device 10 is mounted about a pole 45 with the concave rear surface 15 of the base 12 facing and engaging the pole 45 and the convex front surface 14 facing away from the pole 45. The concave surface 15 of the base 12 conformingly receives the pole 45 and securely mounts about the pole 45 without exposing edges of the base 12 to user contact thereby minimizing injuries to the users of the fastener device 10. To securely mount the fastener device 10 to a pole 45, two holes (not shown) should preferably be tapped in the pole 45 and should be spaced to align with the two mounting holes 21 and 22 through the base 12 of the fastener device 10 with two bolts or screws preferably mounted through the two mounting holes 21 and 22 in the base 12 and through the two holes tapped in the pole 45. As an alternative to bolting the device 10 to a pole 45, the user can mount the device 10 to a pole 45 or the like with straps (not shown) securely but removably wrapped about the pole 45 and the fastener device 10 in the grooves 23 and 24 and behind the strap guide members 18. After the straps are wound in and about the grooves 23 and 24 in the base 12 and about the pole 45, the user cinches the strap about the pole 45 and the device 10 to securely mount the device 10 to the pole 45.

To use the fastener device 10, the user preferably extends the end of the flexible line 40 down through the grommet 20 near the top end 16 of the base and strings the flexible line 40 about the V-shaped ends 30, 31, and 32 of the cleats 25, 26, and 27 and winds the flexible line 40 about the clasp member 28 to substantially secure the flexible line 40. As the flexible line is wound about each V-shaped end of each cleat, the user extends or winds the flexible line 40 through the space between the cleats 25, 26, and 27 and generally zigzags the flexible line 40 about the cleats. The ribs 35 on the lower and upper surfaces of the V-shaped ends substantially grip the flexible line 40 and substantially prevent the flexible line from slipping through the cleats 25, 26, and 27.

The grommet 20 permits the user to anchor a flexible line 40 to the fastener device 10 at angles to the plane in which all the cleats 25, 26, and 27 lie or at angles to the front surface 14 of the base 12 without breaking off the cleats 25, 26, and 27. A flexible line 40 would directly to the cleats 25, 26, and 27, especially to the top cleat, from an acute angle away from the front surface 14 of the base 12 puts stress on the upper surfaces of the cleats and effects fatigue on the upper surfaces of the cleats effecting breakage of the cleats.

It will be obvious that various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A flexible line fastener device comprising:
   a base being curved and shaped to effectively and removeably mount about a stationary object such as pole and the like, and having a front surface and a back surface and a top end and a bottom end;

an anchor means fixedly disposed in said front surface of said base near said top end thereof for anchoring a flexible line;

a plurality of cleats fixedly integral to and projecting from said front surface of said base, each of said cleats further having an open end which has an upper and lower surface converging at an acute angle and having a plurality of ribs extending longitudinally upon said upper and lower surfaces for effectively gripping a flexible line wound through and about said cleats; and a clasp member disposed in said front surface of said base for holding said flexible line.

2. A flexible line fastener device as described in claim 1, wherein said anchor means is a grommet through which said flexible line is passed to anchor said flexible line.

3. A flexible line fastener device as described in claim 1, wherein said plurality of cleats are angled relative to the axes of said base and are spaced apart to receive a flexible line therebetween for quick and effective fastening of said flexible line.

4. A flexible line fastener device as described in claim 3, wherein said converging joints of said upper and lower surfaces of said cleats have gripping surfaces angled relative to the longitudinal axes of said cleats for effective gripping of said flexible line.

5. A flexible line fastener device as described in claim 3, wherein said open ends of said cleats are directed generally downwardly relative to the opposite ends of said cleats.

* * * * *